United States Patent
Kim et al.

(10) Patent No.: US 9,757,993 B2
(45) Date of Patent: Sep. 12, 2017

(54) APPARATUS AND METHOD FOR MONITORING TIRE PRESSURE

(71) Applicant: HYUNDAI AUTRON CO., LTD., Seongnam-si (KR)

(72) Inventors: Tae-Hun Kim, Yongin-si (KR); Seung-Hwan Shin, Gwangmyeong-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 147 days.

(21) Appl. No.: 14/560,370

(22) Filed: Dec. 4, 2014

(65) Prior Publication Data

US 2016/0082790 A1  Mar. 24, 2016

(30) Foreign Application Priority Data

Sep. 24, 2014  (KR) .................. 10-2014-0127608

(51) Int. Cl.
| | |
|---|---|
| *B60C 23/00* | (2006.01) |
| *B60C 23/02* | (2006.01) |
| *B60C 23/06* | (2006.01) |
| *B60W 40/12* | (2012.01) |

(52) U.S. Cl.
CPC ............ *B60C 23/02* (2013.01); *B60C 23/062* (2013.01); *B60W 40/12* (2013.01)

(58) Field of Classification Search
None
See application file for complete search history.

(56) References Cited

U.S. PATENT DOCUMENTS

| | | | | |
|---|---|---|---|---|
| 5,557,552 | A | * | 9/1996 | Naito ............... B60C 11/24 340/438 |
| 2002/0024432 | A1 | | 2/2002 | Lin et al. |
| 2002/0157461 | A1 | | 10/2002 | Schmidt et al. |

(Continued)

FOREIGN PATENT DOCUMENTS

| | | |
|---|---|---|
| CN | 102452280 A | 5/2012 |
| DE | 692 33 018 T2 | 1/2004 |

(Continued)

*Primary Examiner* — Brian Zimmerman
*Assistant Examiner* — Kevin Lau
(74) *Attorney, Agent, or Firm* — Morgan, Lewis & Bockius LLP (57) ABSTRACT

A tire pressure monitoring apparatus includes a frequency detection unit configured to detect a resonant frequency according to a tire pressure; a calculation unit configured to accumulate the resonant frequency and calculate an average frequency and a frequency variance; a coordinate system setting unit configured to locate a first average variance point corresponding to the average frequency and the frequency variance, on an average-variance plane, and locate second average variance points corresponding to average frequencies and frequency variances of resonant frequencies measured for types of tires, on the average-variance plane; a tire determination unit configured to determine a type of a tire in consideration of distances between the first and second average variance points; and a low-pressure frequency setting unit configured to set a low-pressure frequency according to the determined type of the tire, as a reference low-pressure frequency for determining whether the tire pressure is a low pressure.

6 Claims, 6 Drawing Sheets

(56) References Cited

U.S. PATENT DOCUMENTS

2010/0204869 A1* 8/2010 Hall ................... B60C 23/061
  701/31.4
2010/0225463 A1* 9/2010 Fujita ................. B60C 23/062
  340/443

FOREIGN PATENT DOCUMENTS

| EP | 0578826 A1 | | 5/1993 |
|----|------------|---|--------|
| JP | 06115328 A | * | 4/1994 |
| JP | 7-137509 A | | 5/1995 |
| JP | 2002-160512 A | | 6/2002 |
| JP | 2005-14664 A | | 1/2005 |
| JP | 2010-52502 A | | 3/2010 |
| WO | WO 2005/005175 A1 | | 1/2005 |

* cited by examiner

APPARATUS AND METHOD FOR MONITORING TIRE PRESSURE

CROSS-REFERENCE TO RELATED APPLICATION

This application claims priority to Korean Patent Application No. 10-2014-0127608 filed on 24 Sep. 2014, and all the benefits accruing therefrom under 35 U.S.C. §119, the contents of which is incorporated by reference in its entirety.

BACKGROUND

1. Technical Field

The present disclosure relates to an apparatus and a method for monitoring a tire pressure, and more particularly, to an apparatus and a method for monitoring a tire pressure, which are capable of determining whether a tire pressure is a low pressure, from a frequency deviation between a resonant frequency according to the tire pressure and a low-pressure frequency.

2. Related Art

The pressure of a tire is a factor that is directly connected with the stability of a vehicle. When the pressure of a tire drops under a reference pressure, a big accident may occur. In general, since it is difficult to directly measure the pressure of a tire, an indirect type tire pressure monitoring system is used to indirectly determine whether the pressure of a tire is a low pressure, by using a resonant frequency according to the pressure of a tire.

In a conventional tire pressure monitoring system, whether the pressure of a tire is decreased is determined based on a resonant frequency. That is to say, by calculating the frequency deviation between a resonant frequency and a low-pressure frequency, whether the pressure of a tire is a low pressure may be indirectly determined.

Depending on the characteristics of a tire for each tire type, for example, various factors such as the dimensions, tread pattern, sidewall size, and material of the tire, a low-pressure frequency as a reference for determining whether the pressure of a tire is a low pressure may differ.

Although the characteristics of a tire of a vehicle were changed because the tire was replaced, an existing low-pressure frequency may be used to determine whether the pressure of a replacement tire is a low pressure. In this case, it is difficult to accurately determine whether the pressure of the tire is a low pressure. Furthermore, if a determination is not accurately made for whether the pressure of the tire is a low pressure, a big accident may occur.

SUMMARY

Various embodiments are directed to a tire pressure monitoring apparatus and method capable of locating average variance points for average frequencies and frequency variances of resonant frequencies for tire pressure on an average-variance plane, locating average variance points for average frequencies and frequency variances, which are measured in advance for types of tires, on the average-variance plane, determining the type of a tire according to distances between the average variance points on the average-variance plane, determining whether the pressure of the tire is low, based on a low-pressure frequency for the determined tire type, and reflecting a change in frequency characteristic, caused by a replaced tire, when determining whether the pressure of the tire is low, thereby significantly improving stability during operation.

In an embodiment, a tire pressure monitoring apparatus may include: a frequency detection unit configured to detect a resonant frequency according to a tire pressure; a calculation unit configured to accumulate the resonant frequency and calculate an average frequency and a frequency variance; a coordinate system setting unit configured to locate a first average variance point corresponding to the average frequency and the frequency variance, on an average-variance plane, and locate second average variance points corresponding to average frequencies and frequency variances of resonant frequencies which are measured in advance for types of tires, on the average-variance plane; a tire determination unit configured to determine a type of a tire in consideration of distances between the first average variance point and the second average variance points on the average-variance plane; and a low-pressure frequency setting unit configured to set a low-pressure frequency according to the determined type of the tire, as a reference low-pressure frequency for determining whether the tire pressure is a low pressure.

In an embodiment, a tire pressure monitoring method may include: detecting, by a frequency detection unit, a resonant frequency according to a tire pressure; calculating, by a calculation unit, an average frequency and a frequency variance by accumulating the resonant frequency; locating, by a coordinate system setting unit, a first average variance point corresponding to the average frequency and the frequency variance, on an average-variance plane, and locating second average variance points corresponding to average frequencies and frequency variances of resonant frequencies which are measured in advance for types of tires, on the average-variance plane; determining, by a tire determination unit, a type of a tire in consideration of distances between the first average variance point and the second average variance points on the average-variance plane; and setting, by a low-pressure frequency setting unit, a low-pressure frequency according to the determined type of the tire, as a reference low-pressure frequency for determining whether the tire pressure is a low pressure.

DETAILED DESCRIPTION

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Moreover, detailed descriptions related to well-known functions or configurations will be ruled out in order not to unnecessarily obscure subject matters of the present invention. Throughout the disclosure, like reference numerals refer to like parts throughout the various figures and embodiments of the disclosure.

Figure 1:
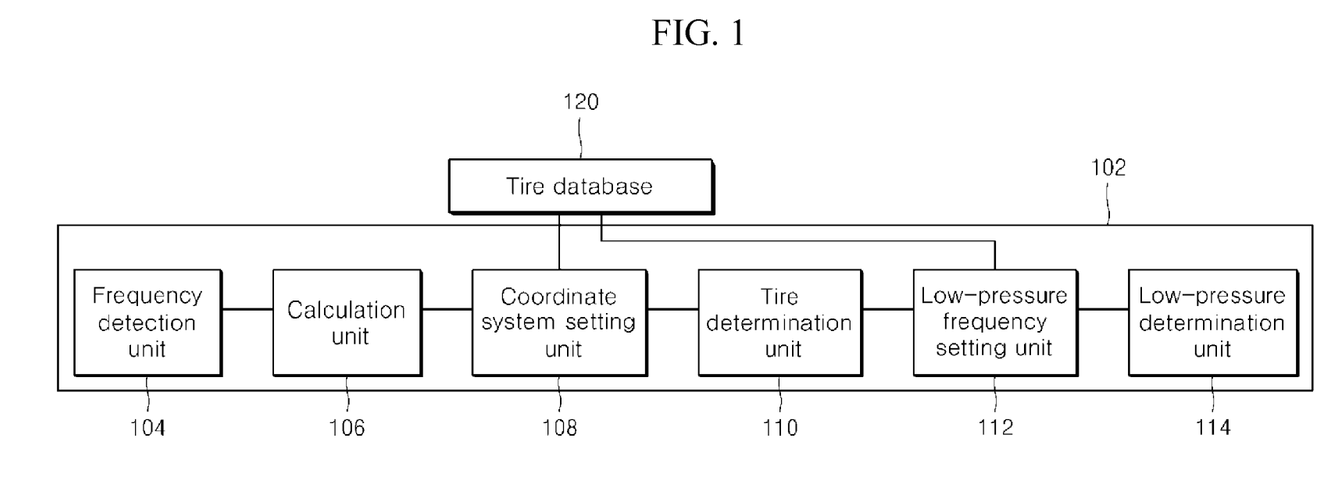
FIG. 1 is a configuration diagram of a tire pressure monitoring apparatus in accordance with an embodiment of the present invention.

FIG. 1 is a configuration diagram of a tire pressure monitoring apparatus in accordance with an embodiment of the present invention. Referring to FIG. 1, the tire pressure monitoring apparatus 102 in accordance with the embodiment of the present disclosure may a frequency detection unit 104, a calculation unit 106, a coordinate system setting unit 108, a tire determination unit 110, a low-pressure frequency setting unit 112, and a low-pressure determination unit 114.

The frequency detection unit 104 may detect a resonant frequency for tire pressure. More specifically, the frequency detection unit 104 may calculate the resonant frequency based on speed information acquired from a speed sensor installed on a wheel of a vehicle. The resonant frequency may differ depending on the characteristics of tires, for example, the sizes, tread patterns, sidewall sizes, and materials of the tires. Furthermore, depending on the speed of the vehicle, the resonant frequency may differ even at the same tire pressure.

The calculation unit 106 may accumulate resonant frequencies and calculate an average frequency and frequency variance. In an embodiment of the present invention, the average frequency of the resonant frequencies may be calculated through the following process.

$$\mathrm{mean}(k)=((\mathrm{mean}(k-1)\times(k-1))+r\mathrm{freq}(k))/k$$

Here, mean(k) represents the average frequency, mean(k−1) represents an average frequency of first to (k−1)-th resonant frequencies, and rfreq(k) represents a k-th resonant frequency. In this way, the calculation unit 106 may calculate the average frequency of the first to k-th resonant frequencies.

Furthermore, in accordance with the embodiment of the present invention, the frequency variance of the resonant frequencies may be calculated through the following process.

$$\mathrm{var}(k)=[(k-1)\times(\mathrm{var}(k-1)+\mathrm{mean}(k-1)^2)+(r\mathrm{freq}(k)-\mathrm{mean}(k))^2)]/k-\mathrm{mean}(k)^2$$

Here, var(k) represents a variance of the first to (k−1)-th resonant frequencies.

As such, the calculation unit 106 may accumulate the resonant frequencies, and calculate the average frequency and frequency variance. Since the resonant frequency may differ depending on the speed of the vehicle, the calculation unit 106 may accumulate resonant frequencies for each preset speed section, and calculate an average frequency and frequency variance of resonant frequencies for the speed section.

The coordinate system setting unit 108 may locate a first average variance point corresponding to the average frequency and frequency variance on an average-variance plane, and locate second average variance points corresponding to average frequencies and frequency variances of resonant frequencies, which are measured in advance for types of tires, on the average-variance plane.

Figure 2:
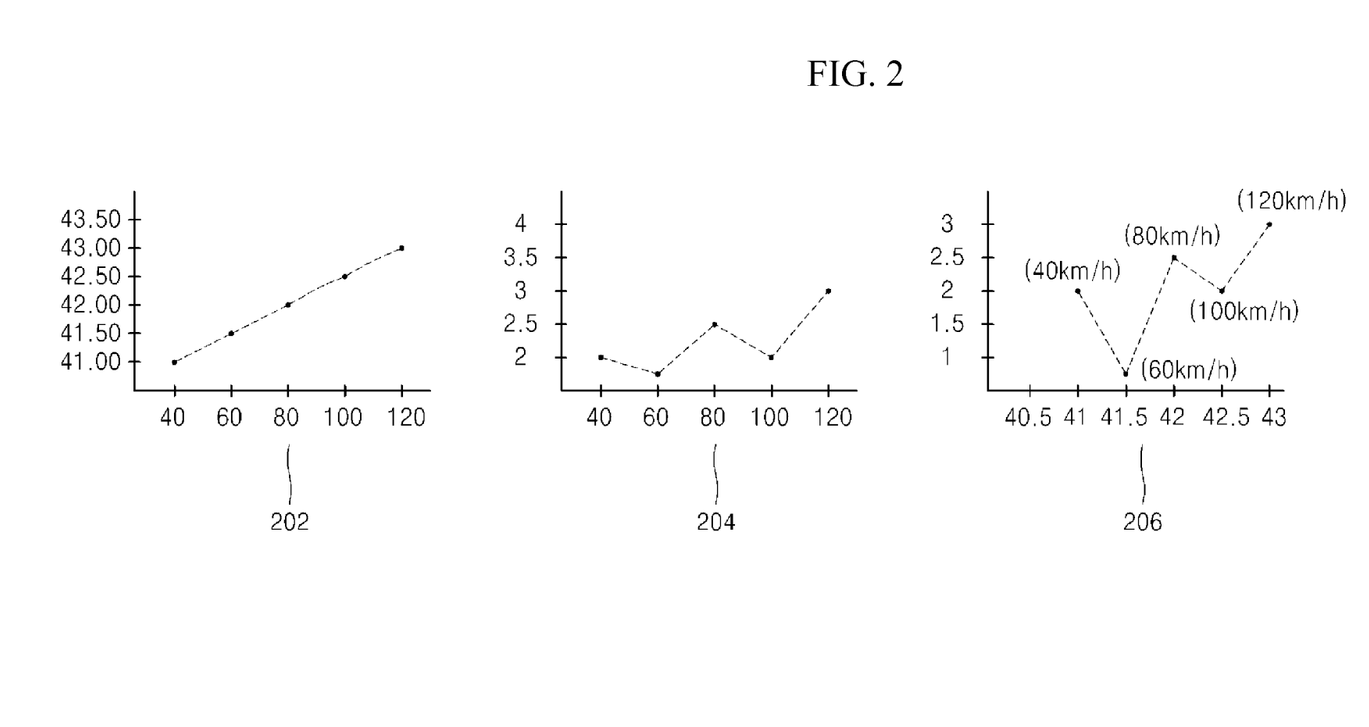
FIG. 2 is a diagram illustrating an average frequency and frequency variance for each speed section and an average-variance plane in accordance with the embodiment of the present invention.

FIG. 2 is a diagram illustrating an average frequency and frequency variance for each speed section and an average-variance plane in accordance with the embodiment of the present invention. FIG. 2 illustrates an average frequency graph 202 for each speed section, a frequency variance graph 204 for each speed section, and an average-variance plane 206 on which an average variance point corresponding to an average frequency and frequency variance of each speed section is located.

As described above, the calculation unit 106 may calculate an average frequency and frequency variance of resonant frequencies. Desirably, the calculation unit 106 may calculate an average frequency and frequency variance of resonant frequencies for each speed section.

The speed section may represent a section obtained by dividing the speed of the vehicle by a predetermined interval. For example, a speed section of 30 km/h to 130 km/h may be divided into five speed sections. In this case, the respective speed sections may be set to a speed section of 30 km/h to 50 km/h, a speed section of 50 km/h to 70 km/h, a speed section of 70 km/h to 90 km/h, a speed section of 90 km/h to 100 km/h, and a speed section of 110 km/h to 130 km/h. Hereafter, the respective speed sections may be referred to as 40 hm/h section, 60 km/h section, 80 km/h section, 100 km/h section, and 120 km/h section, which represent the average speeds of the respective speed sections.

In FIG. 2, the frequency graph 202 for each speed section indicates an average frequency for each speed section, and the frequency variance graph 204 for each speed section indicates a frequency variance for each speed section. Furthermore, the frequency graph 202 for each speed section and the frequency variance graph 204 for each speed section may be used to indicate the average frequency and frequency variance on the same plane.

The average-variance plane is where the average frequencies and the frequency variances are indicated. In an embodiment of the present invention, the average-variance plate is a two-dimensional plane of which the x-axis represents an average frequency and the y-axis represents a frequency variance. On the other hand, the x-axis may be set to a frequency variance, and the y-axis may be set to an average frequency. FIG. 2 illustrates the average-variance plane of which the x-axis represents an average frequency and the y-axis represents a frequency variance.

As illustrated in FIG. 2, average variance points corresponding to average frequencies and frequency variances for the respective speed sections may be located on the average-variance plane 206. That is, an average variance point corresponding to the average frequency and frequency variance of the 40 km/h section, an average variance point corresponding to the average frequency and frequency variance of the 60 km/h section, an average variance point corresponding to the average frequency and frequency variance of the 80 km/h section, an average variance point corresponding to the average frequency and frequency variance of the 100 km/h section, and an average variance point corresponding to the average frequency and frequency variance of the 120 km/h section may be located on the average-variance plane 206.

The characteristics of a tire, such as the size, tread pattern, sidewall size, and material of the tire, may be reflected into a resonant frequency. Thus, the average variance points may be located on the average-variance plane, and the relations among the average variance points may be analyzed to determine the type of a tire, corresponding to the type of the tire mounted in the vehicle, among various tire types.

For this operation, measurement data for various types of tires, which are obtained in advance through a test, may be stored in a database. The measurement data may include an average frequency and frequency variance of resonant frequencies and a low-pressure frequency for each tire type. Furthermore, the measurement data may include average frequencies and frequency variances which are measured for a plurality of speed sections.

In the embodiment of the present invention, the tire database 120 may store data which are measured in advance for the respective tires through a test. The measurement data may include an average frequency and frequency variance of resonant frequencies and a low-pressure frequency for each tire type.

The coordinate system setting unit 108 may locate a first average variance point, corresponding to the average frequency and frequency variance calculated by the calculation unit 106, on an average-variance plane and locate second average variance points, corresponding to average frequencies and frequency variances which are measured in advance for types of tires based on the measurement data of the tire database 120, on the average-variance plane, thereby generating a graph. The measurement data may include an average frequency, a frequency variance, and a low-pressure frequency for each of one or more tire types. Thus, one or more second average variance points may be located on the average-variance plane.

Desirably, the coordinate system setting unit 108 may locate the first and second average variance points on the average-variance plane such that the first and second average variance points are distinguished for the respective speed sections.

The tire determination unit 110 may determine the type of a tire in consideration of distances between the first average variance point and the second average variance points. As described above, one or more second average variance points for each tire type may be located on the average-variance plane.

In the present embodiment, the tire determination unit 110 may calculate the distances between the first average variance point and the second average variance points on the average-variance plane, and compare the calculated distances to determine a tire type, which corresponds to a second average variance point having the minimum distance from the first average variance point among the second average variance points, as the type of the tire mounted on the current vehicle.

However, a second average variance point closer to the first average variance point than the other second average variance points may exist even though a tire type corresponding to the second average variance point has a different characteristic from the tire mounted on the current vehicle. In this case, a totally different tire type may be determined as the type of the tire mounted on the current vehicle. Thus, an effective distance range may be set for the distances between the first average variance point and the second average variance points on the average-variance plane. When the distance deviates from the effective distance range, a predetermined tire type may be determined as the type of the tire mounted on the current vehicle. The effective distance range may be set to a predetermined distance, or an equation of circle or ellipse may be used to set the effective distance range.

Figure 3:
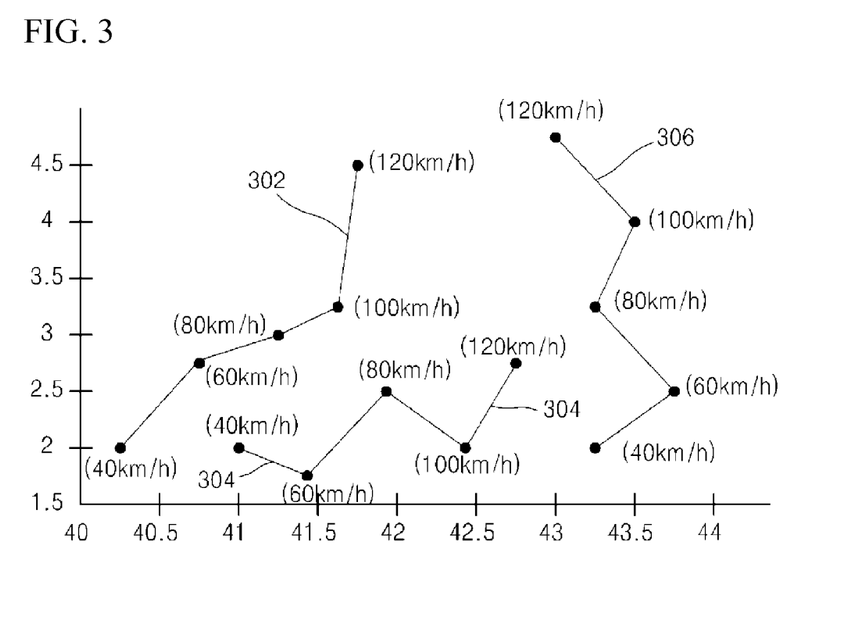
FIG. 3 is a diagram illustrating an average-variance plane on which second average variance points corresponding to average frequencies and frequency variances for various types of tires are located in accordance with the embodiment of the present invention.

FIG. 3 is a diagram illustrating an average-variance plane on which second average variance points corresponding to average frequencies and frequency variances for various types of tires are located in accordance with the embodiment of the present invention. Referring to FIG. 3, average variance points for the respective speed sections, which are measured in advance for three types of first to third tires 302, 304, and 306, are located on the average-variance plane.

Since all resonant frequencies of the three tire types exist in a frequency of 40 Hz to 44 Hz, the three tire types cannot be distinguished from each other in case where only average frequencies is considered. In accordance with the embodiment of the present invention, however, the second average variance points are located on the average-variance plane, in consideration of frequency variances as well as average frequencies. Thus, as illustrated in FIG. 3, three tire types having different characteristics may be distinguished from each other.

Figure 4:
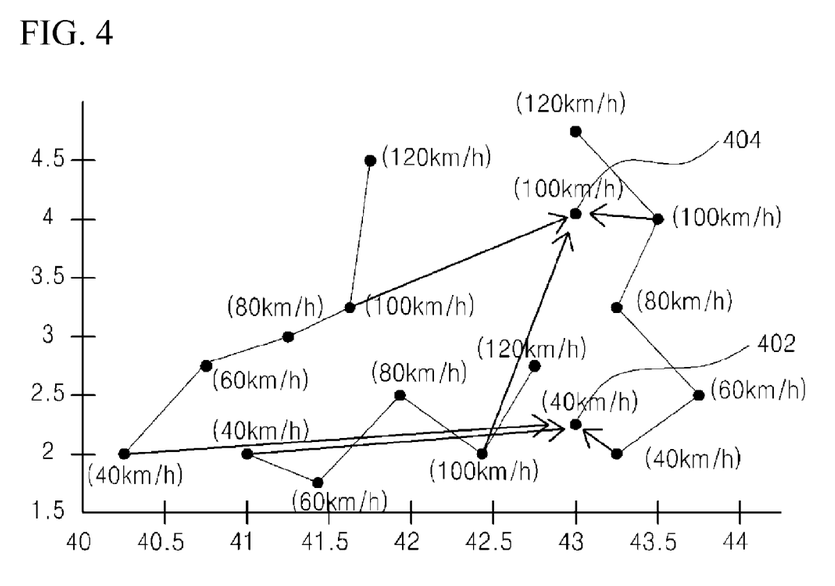
FIG. 4 is a diagram for explaining a process of determining the type of a tire according to distances between a first average variance point and the second variance points on the average-variance plane in accordance with the embedment of the present invention.

FIG. 4 is a diagram for explaining the process of determining the type of a tire based on the distances between the first average variance point and the second variance points on the average-variance plane in accordance with the embedment of the present invention. Referring to FIG. 4, the first average variance point corresponding to the average frequency and frequency variance of the tire mounted on the vehicle may be located on the average-variance plane on which the second average variance points corresponding to the average frequencies and frequency variances for the respective tire types are located as illustrated in FIG. 3, and the distances between the first average variance point and the second average variance points may be considered to determine the type of the tire.

For example, it is assumed that an average frequency and a frequency variance of resonant frequencies for the pressure of the tire mounted on the vehicle are 43 Hz and 2.3 in the 40 km/h section, and 43 Hz and 4 in the 100 km/h section.

The tire determination unit 110 may calculate distances between a first average variance point 402 and second average variance points in the 40 km/h section, and determine a tire type, which corresponds to a second average variance point having the minimum distance from the first average variance point 402 among the second average variance points, as the type of the tire mounted on the vehicle. Similarly, the tire determination unit 110 may calculate distances between a first average variance point 404 and second average variance points in the 100 km/h section, and determine a tire type, which corresponds to a second average variance point having the minimum distance from the first average variance point 404 among the second average variance points, as the type of the tire mounted on the vehicle.

In the above-described example, the average frequency of the first tire in the 100 km/h section is distributed at about 41.7 Hz, the average frequency of the second tire in the 100 km/h section is distributed at about 43.5 Hz, and the average frequency of the third tire in the 100 km/h section is distributed at about 43.5 Hz. Thus, when only the average frequencies are considered, it is difficult to determine to which one of the second tire (42.5 Hz) and the third tire (43.5 Hz) the tire (43 Hz) mounted on the vehicle has a similar characteristic.

In the embodiment of the present invention, however, the frequency variances as well as the average frequencies are considered. Thus, the type of the third tire having the minimum distance from the first average variance point 404 may be estimated to be equal to the type of the tire mounted on the vehicle. Thus, the tire determination unit 110 may determine the third tire as the type of the tire mounted on the vehicle.

Figure 5:
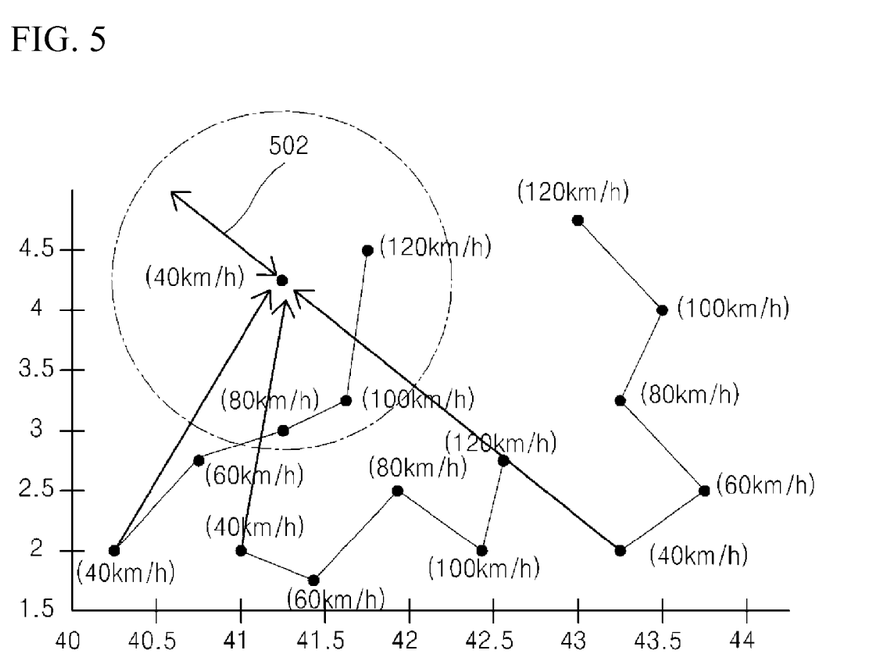
FIG. 5 is a diagram illustrating an effective distance range on the average-variance plane in accordance with the embodiment of the present invention.

FIG. 5 is a diagram illustrating an effective distance range on the average-variance plane in accordance with the embodiment of the present invention. As illustrated in FIG. 5, the effective distance range may be set to a circle which has a radius set to an effective distance 502 from a first average variance point located on the average-variance plane.

The first average variance point in the 40 km/h section is the closest to the second average variance point of the second tire among the second average variance points in the 40 km/h section, but deviates from the effective distance range. Thus, the tire determination unit 110 may not determine the second tire as the type of the tire mounted on the vehicle. In this case, the tire determination unit 110 may determine a basic tire type as the type of the tire mounted on the vehicle.

The low-pressure frequency setting unit 112 may set a low-pressure frequency for the tire type determined by the tire determination unit 110 to a reference low-pressure frequency for determining whether the tire pressure is low. For this operation, the low-pressure frequency setting unit 112 may receive information on the tire type determined by the tire determination unit 110, search for the corresponding tire type in the tire database 120, and apply the low-pressure frequency for the tire type as the reference low-pressure frequency.

In the embodiment of the present invention, the tire pressure monitoring apparatus 102 in accordance with the embodiment of the present invention may further include the low-pressure determination unit 114 for determining whether the tire pressure is low, based on a frequency deviation between the reference low-pressure frequency and the resonant frequency for the tire pressure.

In accordance with the embodiment of the present invention, the tire pressure monitoring apparatus may locate average variance points for average frequencies and frequency variances of resonant frequencies for tire pressure on the average-variance plane, locate average variance points for average frequencies and frequency variances, which are measured in advance for types of tires, on the average-variance plane, determine the type of a tire according to distances between the average variance points, and determine whether the pressure of the tire is low, using a low-pressure frequency for the determined tire type. Thus, the tire pressure monitoring apparatus may reflect a change in frequency characteristic, caused by a replaced tire, when determining whether the pressure of the tire is low, thereby significantly improving the stability during operation.

Figure 6:
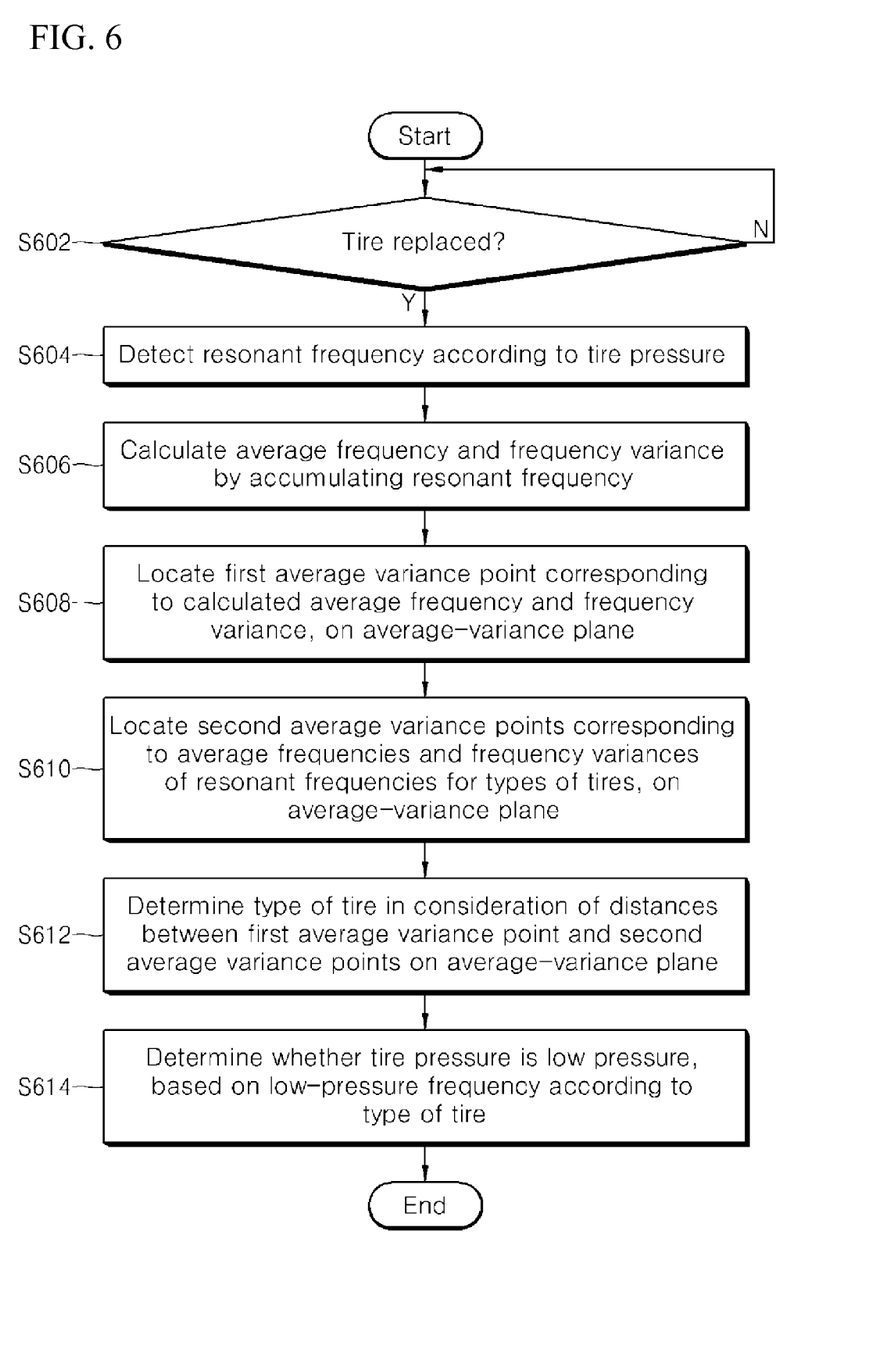
FIG. 6 is a flowchart illustrating a tire pressure monitoring method in accordance with an embodiment of the present invention.

FIG. 6 is a flowchart illustrating a tire pressure monitoring method in accordance with an embodiment of the present invention. Referring to FIG. 6, whether a tire was replaced may be first determined at step S602. Whether the tire was replaced may be determined by receiving a tire replacement signal from an electronic control unit (ECU) or receiving a signal generated through a user's operation for a tire replacement button.

Then, a resonant frequency for tire pressure may be detected at step S604. As described above, a speed sensor may be installed at a wheel of a vehicle, and the resonant frequency may be detected on the basis of speed information acquired from the speed sensor.

Then, the resonant frequencies may be accumulated to calculate an average frequency and frequency variance at step S606. Desirably, step S606 may include accumulating resonant frequencies for a plurality of speed sections and calculating average frequencies and frequency variances for the respective speed sections. The speed sections may be set to a speed section of 30 km/h to 50 km/h, a speed section of 50 km/h to 70 km/h, a speed section of 70 km/h to 90 km/h, a speed section of 90 km/h to 100 km/h, and a speed section of 110 km/h to 130 km/h, and an average frequency and frequency variance of resonant frequencies may be calculated for each speed section.

Then, a first average variance point corresponding to the calculated average frequency and frequency variance may be located on the average-variance plane at step S608. The average-variance plane is a two-dimensional plane of which the x-axis represents an average frequency and the y-axis represents a frequency variance. That is, the average-variance plane may be used to monitor an average frequency and frequency variance on the same plane. The x-axis of the average-variance plane may be set to the frequency variance, and the y-axis of the average-variance plane may be set to the average frequency.

Then, second average variance points corresponding to average frequencies and frequency variances of resonant frequencies for various types of tires may be located on the average-variance plane at step S610. As described above, the average frequencies and frequency variances for the respective tire types may be measured in advance through a test. The average frequencies and frequency variances for the respective tire types may be stored in the tire database. The coordinate system setting unit may read the average frequencies and frequency variances for the respective tire types from the tire database, and locate the second average variance points on the average-variance plane. Desirably, steps S608 to S610 may be performed for each of the speed sections. For this operation, steps S608 and S610 may include locating the first average variance point and the second average variance points on the average-variance point such that the first average variance point and the second average variance points are distinguished for each of the speed sections.

Then, the tire determination unit may determine the type of a tire in consideration of the distances between the first average variance point and the second average variance points on the average-variance plane, at step S612. Desirably, step S612 may include calculating the distances between the first average variance point and the second average variance points on the average-variance plane, and determining the type of a tire, which corresponds to a second average variance point having the minimum distance from the first average variance point among the second average variance points, as the type of the tire mounted on the current vehicle. Furthermore, step S612 may include determine a basic tire type as the type of the tire mounted on the vehicle, when the distances between the first average variance point and the second average variance points on the average-variance plane deviate from the effective distance range.

Finally, a low-pressure frequency for the tire type determined step S612 may be used to determine whether the tire pressure is low, at step S614. More specifically, when the type of the tire is determined at step S612, a low-pressure frequency for the type of the tire may be set to the reference low-pressure frequency, and a frequency deviation between the reference low-pressure frequency and the resonant frequency for the tire pressure may be used to determine whether the tire pressure is low.

In accordance with the embodiment of the present invention, the tire pressure monitoring method may locate average variance points for average frequencies and frequency variances of resonant frequencies for tire pressure on the average-variance plane, locate average variance points for average frequencies and frequency variances, which are measured in advance for various types of tires, on the average-variance plane, determine the type of a tire according to distances between the average variance points, and determine whether the pressure of the tire is low, using a low-pressure frequency for the determined tire type. Thus, the tire pressure monitoring method may reflect a change in frequency characteristic, caused by a replaced tire, when determining whether the pressure of the tire is low, thereby significantly improving the stability during operation.

While various embodiments have been described above, it will be understood to those skilled in the art that the embodiments described are by way of example only. Accordingly, the disclosure described herein should not be limited based on the described embodiments.

What is claimed is:

1. A tire pressure monitoring method comprising:
   detecting, by a frequency detection device of a tire pressure monitoring apparatus, a resonant frequency according to a tire pressure;
   calculating, by the tire pressure monitoring apparatus, an average frequency and a frequency variance by accumulating the resonant frequency;
   locating, by the tire pressure monitoring apparatus, a first average variance point corresponding to the average frequency and the frequency variance, on an average-variance plane, and locating second average variance points corresponding to average frequencies and frequency variances of resonant frequencies which are measured in advance for types of tires, on the average-variance plane;
   determining, by the tire pressure monitoring apparatus, a type of a tire in consideration of distances between the first average variance point and the second average variance points on the average-variance plane; and
   setting, by the tire pressure monitoring apparatus, a low-pressure frequency according to the determined type of the tire, as a reference low-pressure frequency for determining whether the tire pressure is a low pressure.

2. The tire pressure monitoring method of claim 1, wherein, after the setting of the low-pressure frequency according to the determined type of the tire, as the reference low-pressure frequency for determining whether the tire pressure is a low pressure, the tire pressure monitoring method further comprises:
   determining, by the tire pressure monitoring apparatus, whether the tire pressure is a low pressure, based on a frequency deviation between the reference low-pressure frequency and the resonant frequency according to the tire pressure.

3. The tire pressure monitoring method of claim 1,
   wherein the calculating of the average frequency and the frequency variance by accumulating the resonant frequency comprises calculating an average frequency and a frequency variance for each speed section by accumulating the resonant frequency for speed sections, and
   wherein the locating of the first average variance point corresponding to the average frequency and the frequency variance, on the average-variance plane, and the locating of the second average variance points corresponding to the average frequencies and the frequency variances of the resonant frequencies which are measured in advance for the types of tires, on the average-variance plane, comprises locating the first average variance point and the second average variance points on the average-variance plane, for each speed section.

4. The tire pressure monitoring method of claim 1, wherein the average-variance plane comprises a two-dimensional plane of which an x-axis is an average frequency and a y-axis is a frequency variance.

5. The tire pressure monitoring method of claim 1, wherein the determining of the type of the tire in consideration of the distances between the first average variance point and the second average variance points on the average-variance plane comprises:
   calculating the distances between the first average variance point and the second average variance points on the average-variance plane; and
   determining a tire type which corresponds to a second average variance point having a minimum distance to the first average variance point among the second variance points, as the type of the tire mounted on a vehicle.

6. The tire pressure monitoring method of claim 1, wherein the determining of the type of the tire in consideration of the distances between the first average variance point and the second average variance points on the average-variance plane comprises determining a basic tire type as the type of the tire mounted on the vehicle, when the distances between the first average variance point and the second average variance points on the average-variance plane deviate from a preset effective distance range.

* * * * *